(12) United States Patent
Chatterjee et al.

(10) Patent No.: US 10,467,075 B1
(45) Date of Patent: Nov. 5, 2019

(54) SYSTEMS, DEVICES AND METHODS FOR PREDICTING DISK FAILURE AND MINIMIZING DATA LOSS

(71) Applicant: American Megatrends, Inc., Norcross, GA (US)

(72) Inventors: Paresh Chatterjee, Fremont, CA (US); Anandh Mahalingam, Bellevue, WA (US); Narayanaswami Ganapathy, Newark, CA (US); Venugopalreddy Mallavaram, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 16/270,368

(22) Filed: Feb. 7, 2019

Related U.S. Application Data

(63) Continuation of application No. 15/353,776, filed on Nov. 17, 2016, now abandoned.
(Continued)

(51) Int. Cl.
*G06F 11/07* (2006.01)
*G06F 3/06* (2006.01)
*G06F 11/32* (2006.01)
*G06F 11/10* (2006.01)
*G06F 11/30* (2006.01)
*G06F 11/20* (2006.01)

(52) U.S. Cl.
CPC ........ *G06F 11/0754* (2013.01); *G06F 3/0619* (2013.01); *G06F 3/0689* (2013.01); *G06F 11/079* (2013.01); *G06F 11/0727* (2013.01); *G06F 11/0793* (2013.01); *G06F 11/1084* (2013.01); *G06F 11/203* (2013.01); *G06F 11/2094* (2013.01); *G06F 11/3034* (2013.01); *G06F 11/3058* (2013.01); *G06F 11/3065* (2013.01); *G06F 11/321* (2013.01); *G06F 11/324* (2013.01); *G06F 3/0649* (2013.01)

(58) Field of Classification Search
CPC ............ G06F 11/0754; G06F 11/0727; G06F 11/079; G06F 11/0793; G06F 3/0619; G06F 3/0649; G06F 3/0689; G06F 11/2094; G06F 11/3034; G06F 11/3058; G06F 11/3065; G06F 11/321; G06F 11/324
See application file for complete search history.

(56) References Cited

U.S. PATENT DOCUMENTS

5,727,144 A * 3/1998 Brady .................. G06F 11/004
714/6.12
9,189,309 B1 * 11/2015 Ma ...................... G06F 11/3034
(Continued)

*Primary Examiner* — Paul Contino
(74) *Attorney, Agent, or Firm* — Meunier Carlin & Curfman LLC (57) ABSTRACT

A computer-implemented method for predicting a risk of disk failure is described herein. The method can include collecting a performance parameter for respective disks in a group of disks, and calculating an expected value of the performance parameter for the group of disks. The method can also include comparing a respective value of the performance parameter for a respective disk in the group of disks to the expected value, and predicting a risk of disk failure based on the comparison. For example, when a difference between the respective value of the performance parameter for the respective disk and the expected value exceeds a threshold, the respective disk may be at risk of failing.

19 Claims, 6 Drawing Sheets

Related U.S. Application Data

(60) Provisional application No. 62/257,343, filed on Nov. 19, 2015.

(56) References Cited

U.S. PATENT DOCUMENTS

| | | | | |
|---|---|---|---|---|
| 9,229,796 B1* | 1/2016 | Ma | ............... | G06F 11/008 |
| 10,067,840 B1* | 9/2018 | Labaj | ............... | G06F 11/1076 |
| 2007/0079170 A1* | 4/2007 | Zimmer | ............... | G06F 11/008 |
| | | | | 714/6.23 |
| 2014/0298113 A1* | 10/2014 | Sakurai | ............... | G06F 11/2025 |
| | | | | 714/47.3 |
| 2015/0074367 A1* | 3/2015 | Cher | ............... | G06F 11/008 |
| | | | | 711/165 |
| 2015/0074469 A1* | 3/2015 | Cher | ............... | G06F 11/008 |
| | | | | 714/47.2 |

* cited by examiner

SYSTEMS, DEVICES AND METHODS FOR PREDICTING DISK FAILURE AND MINIMIZING DATA LOSS

CROSS-REFERENCE TO RELATED APPLICATIONS

This application is a continuation of U.S. patent application Ser. No. 15/353,776, filed on Nov. 17, 2016, which claims the benefit of U.S. Provisional Patent Application No. 62/257,343, filed on Nov. 19, 2015, entitled "SYSTEMS, DEVICES AND METHODS FOR PREDICTING DISK FAILURE AND MINIMIZING DATA LOSS," the disclosures of which are expressly incorporated herein by reference in their entireties.

BACKGROUND

Higher capacity and larger numbers of disks are being commissioned to address the challenge of provisioning higher storage capacities. Disks are electromechanical devices and have relatively high failure rates by nature, and higher capacity disks tend to be more prone to errors and failures. Actual failures encountered in the field are likely far in excess of the Annual Failure Rate ("AFR") of the disks as reported by disk manufacturers (i.e., vendors). Additionally, a large number of failures occur within the warranty period from the vendor. Failure of a disk is a very serious event. Although disk failure may not be preventable, ideally, disk failure may be predicted such that action can be taken to prevent data loss or service disruption.

One predictive technique implemented by disk manufacturers uses Self-test, Monitoring, Analysis and Reporting Technique ("S.M.A.R.T.") notifications. S.M.A.R.T. is implemented by disk firmware, where a set of crucial parameters including but not limited to operational temperature, head flying height, spin-up time, and relocated sector count among others are monitored with sensors and analyzed to predict disk failures based on some logical deductions. Today, a large number of vendors now implement this functionality. However, the exact technique followed and the attributes monitored vary from model-to-model. S.M.A.R.T. notifications cannot be fully relied upon for at least two reasons—false alarm rate ("FAR") and disk failures without S.M.A.R.T. notifications.

Vendors have devoted resources to research and develop improvements to the failure prediction using S.M.A.R.T. data. One area that has received attention is improving the accuracy of failure predictions by bringing in some evidence-based conclusions instead of relying only on empirical logic. For example, various Bayesian methods have been developed, and some vendors have developed adaptive learning-based methodology to enhance failure predictions. In these cases, vendors record all of the pre-failure disk events in a central repository and then analyze the events to learn the sequence of events that could result in disk failure. The goal of these learning-based methods is to predict disk failures where a more elementary logic-based prediction algorithm would fail. However complex the method, failure prediction remains an inexact science.

SUMMARY

Methods, systems and devices for predicting a risk of disk failure are described herein. For example, using the techniques described herein, it is possible to detect a poorly performing disk and/or predict a risk of disk failure. By predicting a risk of disk failure, it is possible to minimize data loss in a storage system, for example, by taking appropriate corrective action before disk failure. The techniques described herein take a simplified approach as compared to conventional techniques. In particular, at least one disk behavioral or operational parameter (also referred to herein as a "performance parameter") can be collected. Example performance parameters can include S.M.A.R.T. data. The performance parameter can be analyzed for a group of disks. The performance parameter for the group of disks can optionally be intuitively displayed in order to facilitate an administrator taking appropriate corrective action(s). The group of disks can be any plurality of disks to be collectively analyzed such as disks in close physical proximity, disks in a same enclosure, or a redundant array of inexpensive disks ("RAID") group, as described below. It should be understood that ambient and/or environmental conditions can influence disk health or behavior. Therefore, by conducting a "neighborhood" analysis, e.g., analyzing the performance parameter for the group of disks, outlier disk(s) as compared to the group of disks can be identified as being at risk of disk failure. Appropriate corrective action can then optionally be taken. Corrective actions can include performing media checks, transferring data from the outlier disk(s) to spare disk(s), tagging the outlier disk(s) for removal from the group of disks, taking the outlier disk(s) out of service (i.e., offline), or any other appropriate action.

An example computer-implemented method for predicting a risk of disk failure can include collecting at least one performance parameter for respective disks in a group of disks, and calculating an expected value of the at least one performance parameter for the group of disks. The expected value can optionally be an average value of the at least one performance parameter for the group of disks. The method can also include comparing a respective value of the at least one performance parameter for at least one of the respective disks in the group of disks to the expected value, and predicting a risk of disk failure based on the comparison. For example, when a difference between the respective value of the at least one performance parameter for the at least one of the respective disks in the group of disks and the expected value exceeds a threshold, the at least one of the respective disks in the group of disks may be at risk of disk failure.

Optionally, the method can further include, in response to predicting the risk of disk failure, performing a media error check on the group of disks. Additionally, the method can further include, upon completing the media error check on the group of disks, migrating data from the at least one of the respective disks to a spare disk. After completing the data migration, the at least one of the respective disks can be taken out of service (i.e., taken offline).

Alternatively or additionally, the method can further include providing a notification of the predicted risk of disk failure. For example, the notification can be provided to a user such as a system administrator. This disclosure contemplates that the notification can be graphical, visual, tactile, or audible.

Alternatively or additionally, the method can further include storing the at least one performance parameter for the respective disks in the group of disks in a log. The log can provide a historical record of the at least one performance parameter. For example, the log can be a daily, weekly, monthly or yearly log. This disclosure contemplates storing a respective log for each of the disks in the group of disks. In addition, the log can optionally be stored remotely from the respective disks in the group of disks.

Alternatively or additionally, the method can further include graphically displaying information related to the at least one performance parameter. For example, respective values of the at least one performance parameter for the at least one of the respective disks in the group of disks can be displayed. Alternatively or additionally, the difference between the respective value of the at least one performance parameter for the at least one of the respective disks in the group of disks and the expected value can be displayed.

Optionally, the at least one performance parameter can be at least one of environmental, transport event, or disk error information. Alternatively or additionally, the at least one performance parameter can optionally be S.M.A.R.T. data.

Alternatively or additionally, the group of disks can optionally be at least one of a plurality of disks in close physical proximity, a plurality of disks in a same enclosure, or a RAID group.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for predicting a risk of disk failure in a RAID environment, it will become evident to those skilled in the art that the implementations are not limited thereto, but are applicable for predicting a risk of disk failure for any group of disks.

Figure 1:
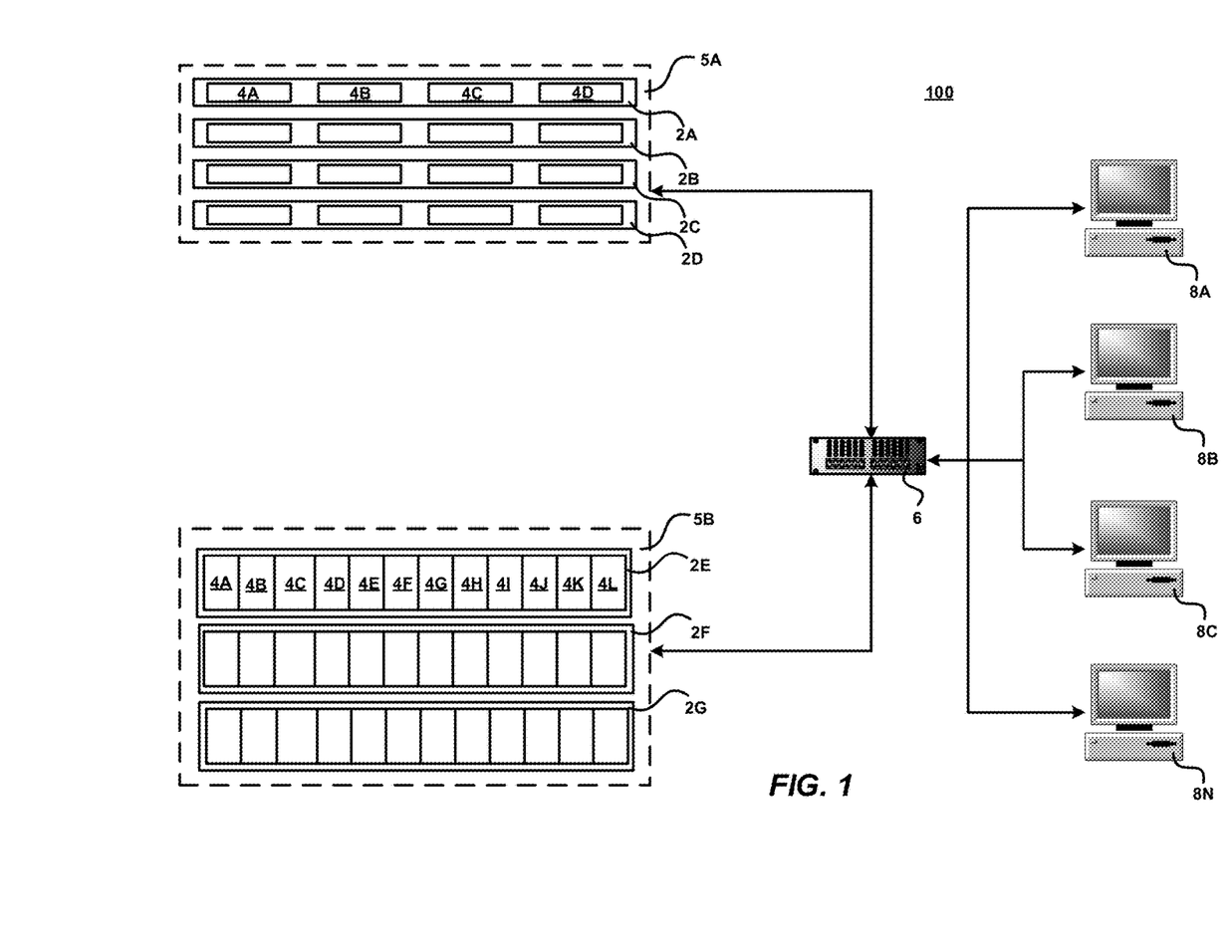
FIG. 1 is a computer architecture and network diagram showing aspects of a computer network and a storage server computer that provides an operating environment for embodiments of the disclosure presented herein.
Figure 2:
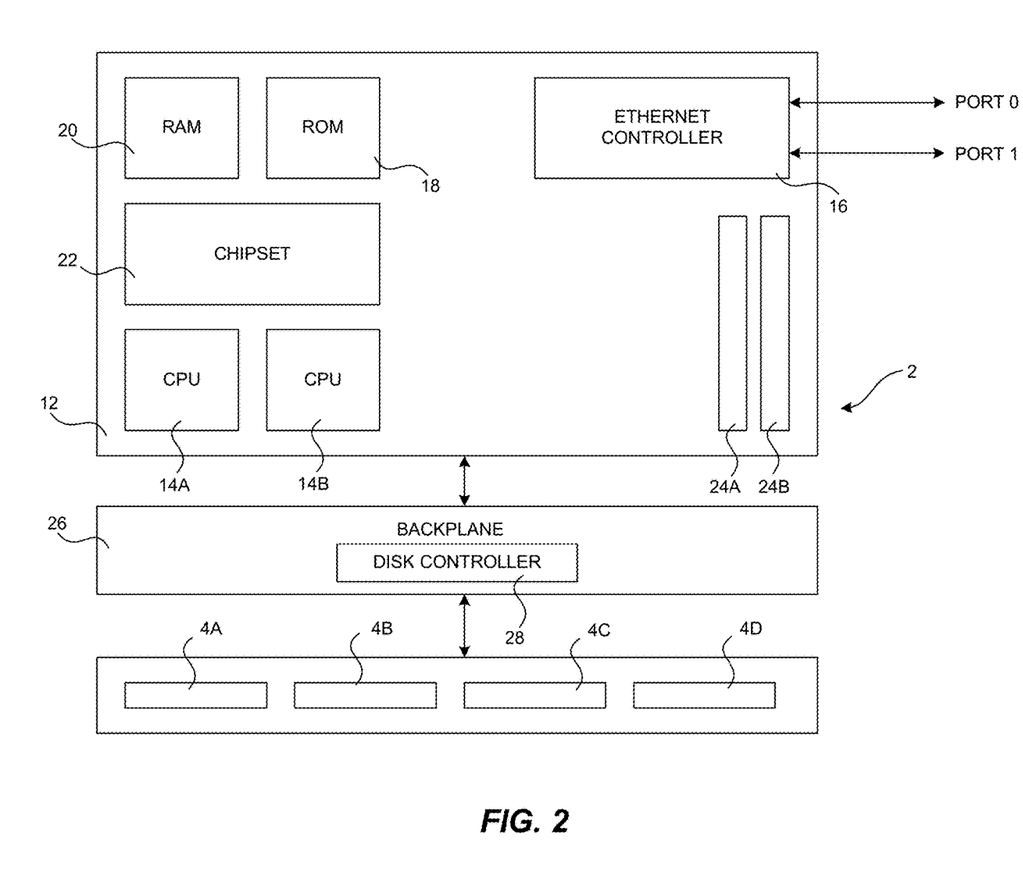
FIG. 2 is a computer architecture diagram illustrating aspects of the hardware of an illustrative storage server computer described herein.

FIGS. 1-2 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Figure 3:
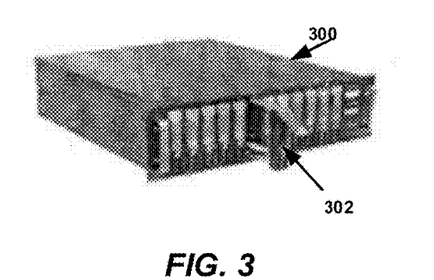
FIG. 3 illustrates an enclosure with a plurality of disks.

Ambient and/or environmental conditions affecting disks can be a factor in disk failure analysis. FIG. 3 illustrates a plurality of disks (e.g., disk 302) in an enclosure 300. As shown in FIG. 3, the disks are in close proximity and ambient and/or environmental conditions can be analyzed to provide an indication of disk heath or behavior. For example, disks can fail due to high enclosure temperature, enclosure power supply problems, or vibrations in the enclosure. Vital environmental statistics of the enclosure that houses the disks can be collected and stored. As described herein, this can include the collection and storage of S.M.A.R.T. data. According to the techniques described herein, the effect of ambient and/or environmental conditions are factored into the disk failure analysis. Alternatively or additionally, disk check-conditions can also be continuously monitored as part of the collection of S.M.A.R.T data and factored into the disk failure analysis. Alternatively or additionally, transport events can also be monitored and factored into the disk failure analysis. It should be understood that some transport failure and/or disk removal events can cause a RAID group to fail a disk.

The information obtained for each individual disk can be compared with similar information obtained for all disks in the same enclosure (e.g., a "neighborhood" analysis). As described herein, a "neighborhood" analysis can provide important information about individual disks the same enclosure. For example, sudden, strong vibrations due to tremors can result in similar check conditions (e.g., non-media errors) for all disks in the same enclosure. Conventionally, check conditions of individual disks in the same enclosure would be considered, and the check conditions would result in predicting failure of all of the disks in the enclosure. However, by performing a "neighborhood" analysis as described herein, only those disks with higher delta values (or abnormally high delta values, e.g., delta values exceeding a predetermined threshold) for non-medium errors as compared to the expected delta value for non-media errors for the other disks in the same enclosure result in a predicted risk of disk failure.

According to the techniques described herein, disk performance and behavior can be monitored and analyzed in real time, e.g., as the disk services input/output ("I/O") operations. As described below, regardless of whether a disk is signaling an error condition (e.g., a S.M.A.R.T. notification), a prediction of disk failure can be made if a disk is not performing as expected as compared to a group of disks, and optionally, action is taken in response to such a prediction. For example, I/O performance data for all the disks in a group of disks can be monitored and analyzed (e.g., averaged). Then, individual disk I/O performance data can be compared with the same I/O performance data for all peer disks in the same enclosure and/or RAID group. Because peer disks in the same enclosure and/or RAID group can be expected to perform similarly, any outlier disk(s) can be identified as being at risk of disk failure and/or further action can be taken (e.g., corrective actions as described below).

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer (e.g., a storage node 2 of FIG. 2), the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 4:
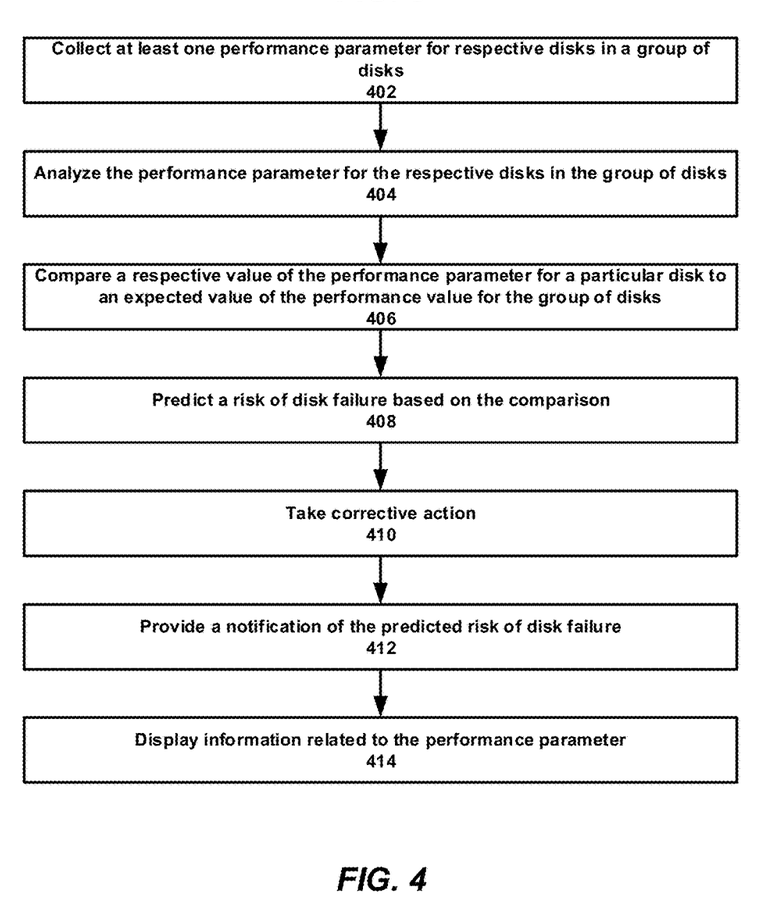
FIG. 4 is a flow diagram illustrating example operations for predicting a risk of disk failure.

Referring now to FIG. 4, a flow diagram illustrating example operations for predicting disk failure are described. At 402, at least one performance parameter for respective disks in a group of disks can be collected. It should be understood that a plurality of performance parameters can optionally be collected for each respective disk in the group of disks. This disclosure contemplates that the performance parameter can be any parameter that provides information about a disk, for example, information about the disk's operation, health, behavior, environment, or any other information. For example, the performance parameter can be environmental information, transport event information, or disk error information. In an example embodiment, the performance parameter can be S.M.A.R.T. data. One of ordinary skill in the art would understand that S.M.A.R.T. data includes a plurality of attributes providing indications of a disk's reliability. Additionally, one or more attributes of S.M.A.R.T. data can be obtained by performing a disk-self-test (e.g., short- and/or long-disk-self-tests). The disk-self-test can optionally be performed as a background operation such that the disk-self-test does not noticeably interfere with foreground I/O performance.

Optionally, the performance parameter for the respective disks in the disk group can be stored in memory. In addition, the respective performance parameters can be stored to minimize the possibility of data loss. For example, the performance parameter for the respective disks in the group of disks can optionally be stored in a multi-mirror RAID partition (e.g., at least a four-disk array) such that data can be retrieved even in the event of multiple disk failures. It should be understood that the multi-mirror RAID partition is only one example technique to minimize the possibility of data loss. This disclosure contemplates that other techniques for minimizing the possibility of data loss can be employed such as storing the data remotely from the group of disks. Optionally, the performance parameter for the respective disks in the group of disks can be stored, for example, in a log. The log can provide a historical record of the performance parameter. For example, the log can be a daily, weekly, monthly or yearly log or a log having any other periodicity. This disclosure contemplates storing a respective log for each of the disks in the group of disks. By minimizing or eliminating data loss, the performance parameter, including the history thereof, can be transmitted to the disk manufacturer following disk failure, which can provided valuable information to the manufacturer. When such information is stored on the failed disk itself, the information may not be recoverable following disk failure, and therefore, cannot be used by the manufacturer to better understand the circumstances at the time of failure.

The group of disks can be any plurality of disks to be collectively analyzed. For example, the group of disks can optionally be a plurality of disks in close physical proximity. Alternatively or additionally, the group of disks can optionally be a plurality of disks in a same enclosure, for example, the disks in the same rack space (e.g., disks 4A-4D of node 2A or disks 4A-4L of node 2E of FIG. 1). Alternatively or additionally, the group of disks can optionally be a RAID group. In addition, as used herein, disks can include hard drives, spinning disks, stationary media, non-volatile memories, or optically scanned media; each, or in combination, employing magnetic, capacitive, optical, semiconductor, electrical, quantum, dynamic, static, or any other data storage technology.

At 404, the performance parameter for the respective disks in the group of disks is analyzed, for example, to obtain an expected value of the performance parameter for the group of disks. The expected value can optionally be an average value of the performance parameter for the group of disks. It should be understood that calculating the average value of the performance parameter is provided only as an example. This disclosure contemplates that analyzing the performance parameter for the group of disk can yield a value other than the average value, including but not limited to a median value, a mode value, or a weighted average value. Then, at 406, a respective value of the performance parameter for a particular disk in the group of disk can be compared to the expected value of the performance value for the group of disks (e.g., the average value of the performance parameter for the group of disks). Alternatively or additionally, a respective delta value of the performance parameter for a particular disk in the group of disks can be compared to the expected delta value of the performance value for the group of disks. This disclosure contemplates that a respective value of the performance parameter for more than one of the disks in the group of disks can be compared to the expected value of the performance value for the group of disks. This disclosure also contemplates that the above comparison can be made for each of the respective disks in the group of disks. This comparison is an intelligent "neighborhood" analysis of the group of disks. Optionally, the intelligent "neighborhood" analysis can be performed in real time. In other words, a particular disk's behavior and/or performance can be compared to the real-time behavior and/or performance of the group of disks. Accordingly, an outlier disk in the group of disks can be identified.

At 408, a risk of disk failure can be predicted based on the comparison in step 406 above. For example, when a difference between the respective value of the performance parameter for the particular disk and the expected value of the performance parameter (e.g., an average value of the performance parameter for the group of disk) exceeds a threshold, the particular disk may be at risk of failure. This disclosure contemplates that the threshold can be set by an administrator of the group of disks. For example, the threshold can optionally be a predetermined deviation (e.g., a standard deviation or a multiple thereof) from the expected value of the performance parameter for the group of disks. The difference between the respective value of the performance parameter for a particular disk and the expected value of the performance parameter for the group of disk is also referred to herein as a delta value. The delta value provides a representation of how much a particular disk's behavior, performance, or environment deviates from that of the group of disks. For example, an abnormally high delta value (e.g., one that exceeds a predetermined threshold value) can provide an indication that a particular disk is at risk of failure.

Optionally, at 410, in response to predicting a risk of disk failure, appropriate corrective action can be taken. For example, the corrective action include performing media checks on the group of disks. The media checks can ensure that there are no media errors on the disks in the group of disks that are operating normally (e.g., the disks not predicted to be at risk of disk failure). The media checks can be performed immediately in response to the predicted risk of disk failure, e.g., prioritized over other operations. Accordingly, in the event the disk predicted to be at risk of disk failure does fail, data can be protected from loss. For example, for a RAID group when no media errors are present, data can be recovered from the operational disks in the disk group. Alternatively or additionally, the corrective action can include transferring data from the disk predicted to be at risk of disk failure (e.g., the outlier disk) to a spare disk such as a hot spare disk. The data transfer can be accomplished before disk failure, which can minimize or eliminate data loss in the event of disk failure. Alternatively or additionally, the disk predicted to be at risk of disk failure can be tagged for removal from the group of disks and/or taken offline (i.e., removed from the group of disks). The corrective actions described above are provided only as examples, and this disclosure contemplates taking any appropriate corrective action in response to predicting a risk of disk failure.

Figure 5:
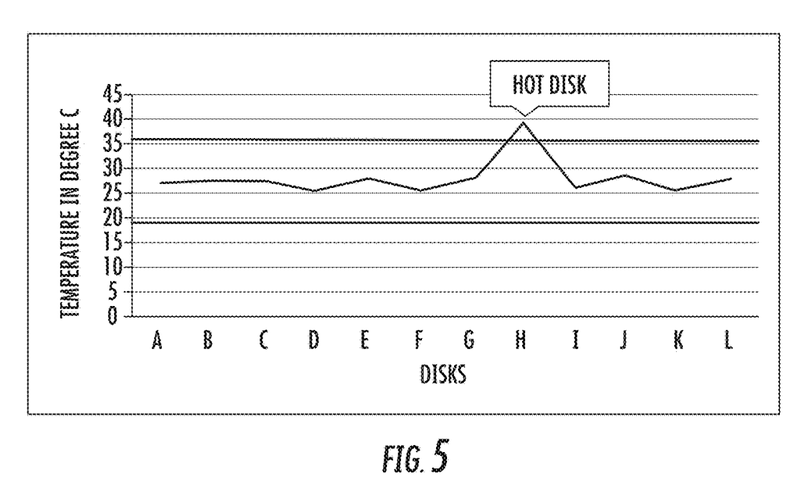
FIG. 5 a graph illustrating example respective temperatures of a plurality of disks in a RAID group.

In one example, the performance parameter can be temperature, and the respective temperature of each disk in a RAID group can be collected. This is shown in FIG. 5, which is a graph illustrating respective temperatures of a plurality of disks (i.e., disks A-L) in a RAID group. In this example, an alarm trip threshold for each of the disks in the RAID group may be approximately 68° C. By observing FIG. 5, it can be seen that the temperature of the majority of the disks (e.g., all disks except disk H) is approximately 28° C. Optionally, as described above, an average temperature for all of the disks in the disk group can be calculated (e.g., approximately 28° C. in FIG. 5). As shown in FIG. 5, a particular disk (i.e., disk H) in the RAID group has a temperature of approximately 42° C. Based on temperature, disk H is an outlier with respect to the RAID group. Disk H can be considered a hot disk. However, the temperature of disk H does not exceed the alarm trip threshold of approximately 68° C., and therefore, the abnormality would not be indicated. Although the alarm is not tripped, disk H may be a matter of concern. Accordingly, using the "neighborhood" analysis techniques described herein, it is possible to detect abnormalities for the RAID group and predict a risk of disk failure. In response to the prediction, appropriate corrective action can be taken with respect to disk H.

Figure 6:
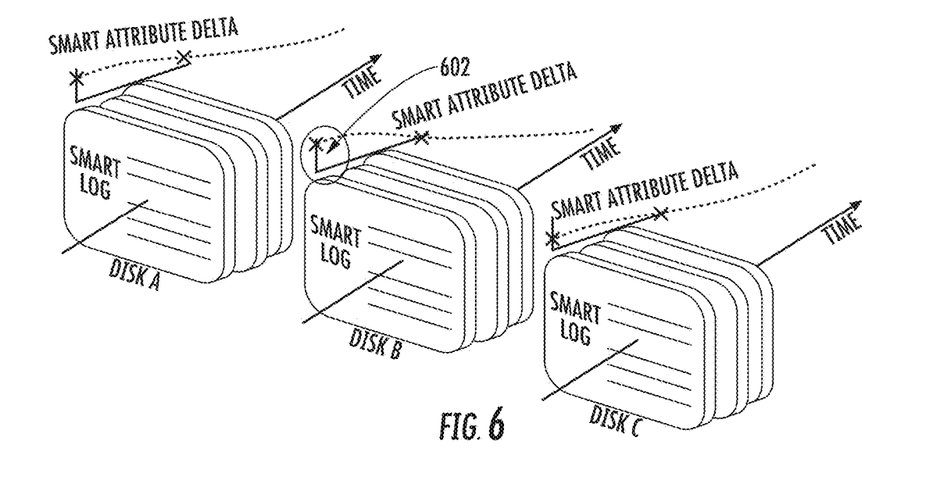
FIG. 6 illustrates example respective delta values of an attribute for a plurality of disks in a RAID group.
Figure 7:
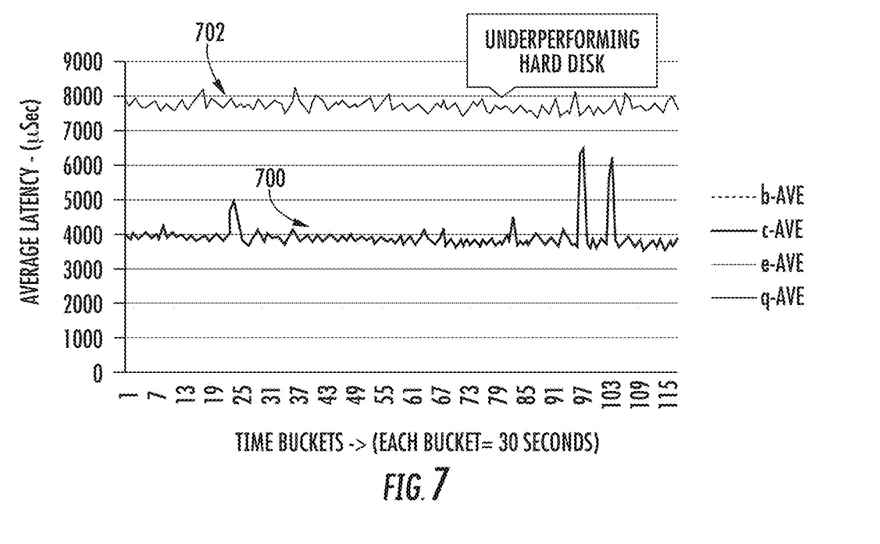
FIG. 7 is a graph illustrating example performance of disks in a RAID group.

In another example, the performance parameter can be non-media errors, and the respective non-media errors of each disk in a RAID group can be collected. Sudden, strong vibrations from tremors may result in increases in non-media errors for all of the disks in the RAID group. As described above, the expected value of non-media errors for the group of disks can be calculated. For example, the expected value of non-media errors can optionally be an average value of the non-media errors for the group of disks. It should be understood that the vibrations may even result in exceeding an alarm trip threshold for non-media errors. According to the techniques described herein, the difference or delta value between the respective value of non-media errors for each disk in the RAID group and the expected value of non-media errors for the RAID group can be calculated. The respective delta values of non-media errors for each disk in the RAID group can be compared to the expected delta value of non-media errors for the RAID group. In this way, the effect of the ambient or environmental conditions (e.g., the tremors) can be accounted for and only abnormal or outlier disk(s) in the RAID group can be predicted as having a risk of disk failure. This is shown in FIG. 6, which illustrates respective delta values of an attribute (e.g., non-media errors) for a plurality of disks (i.e., disks A-B) in a RAID group. As shown in FIG. 6, the delta value 602 for non-media errors for disk B exceed those of disks A and C. In other words, the non-media errors of disk B are abnormally high compared to disks A and C (i.e., peer disks in the RAID group) during the same time period. This can provide an indication of a risk of disk failure. Similar to above, based on non-media errors, disk B is an outlier with respect to the RAID group. Disk B may be a matter of concern. Accordingly, using the "neighborhood" analysis techniques described herein, it is possible to detect abnormalities for the RAID group and predict a risk of disk failure. In response to the prediction, appropriate corrective action can be taken with respect to disk B. FIG. 7 is another graph illustrating the performance of disks in a RAID group. In FIG. 7, the average latency of one disk 702 is abnormally high compared to the average latency of other disks 700 in the RAID group. Disk 702 is therefore an outlier with respect to the other disks 700 and can be identified as being at risk of disk failure.

Figure 8:
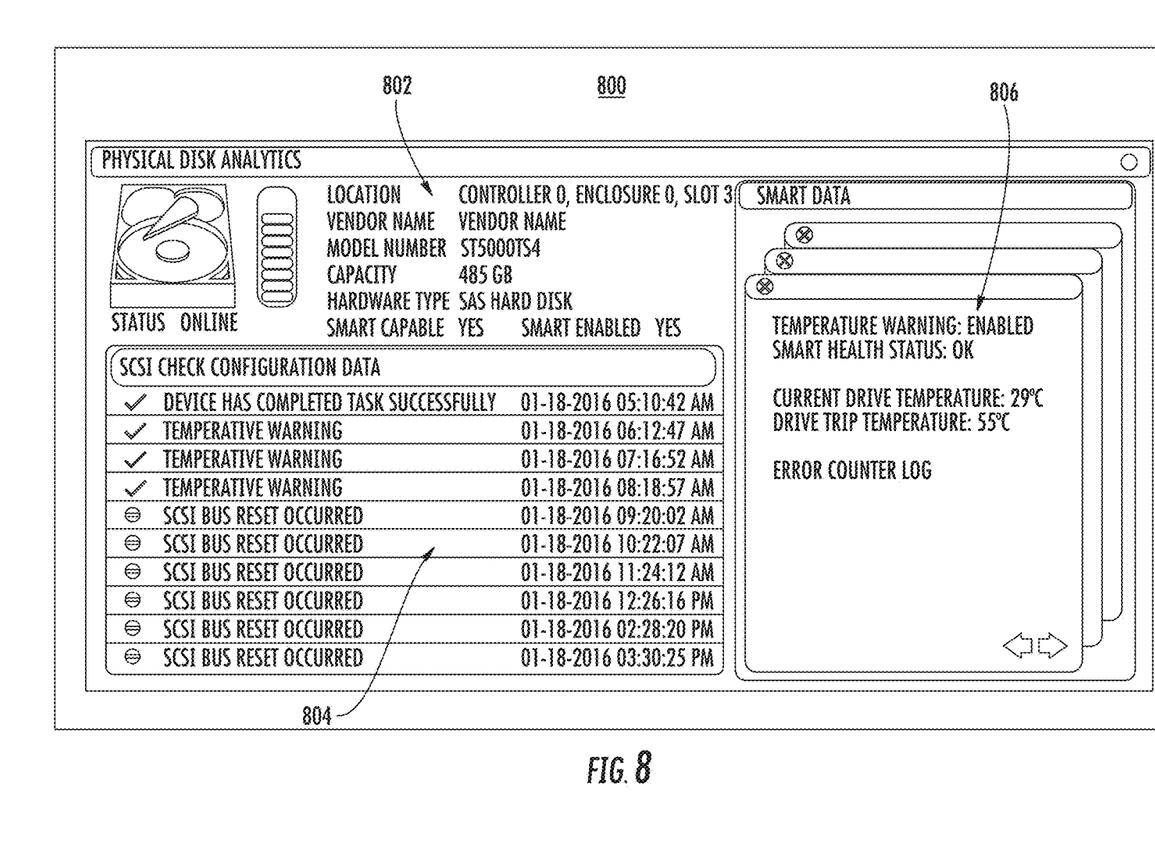
FIG. 8 illustrates an intuitive 3D pictorial representation of a disk to clearly indicate the different status indications.

Notification of a risk of disk failure (e.g., identifying abnormal, outlier, or underperforming disks) through audio, visual, graphical alerts can optionally be provided according to techniques described herein. For example, at 412, a notification of the predicted risk of disk failure can optionally be provided. The notification can be provided to a user such as a system administrator, for example. This disclosure contemplates that the notification can be graphical, visual, tactile, or audible. Alternatively or additionally, at 414, information related to the performance parameter can optionally be graphically displayed. For example, respective values of the performance parameter for the respective disks in the group of disks can be displayed (e.g., as shown in FIGS. 5 and 7) and/or the difference between the respective value of the performance parameter for the respective disks in the group of disks and the expected value can be displayed (e.g., as shown in FIG. 6). In conventional storage systems, important status information, including disk failure predictions, go unnoticed. For example, in conventional RAID stacks, the disk enclosure includes RAID status indicators such as light emitting diode ("LED") indicators. The RAID stack is capable of indicating the disk statuses to the enclosure for each disk. Various standards such as SCSI Enclosure Specification ("SES") and SCSI accessed fault tolerant enclosures ("SAF-TE") are commonly employed to provide indications. However, conventional systems fail to ensure consistency in visual indications. For example, the enclosure manufacturers choose their own way to indicate the status. Thus, some enclosures may indicate failure with a red LED, while other enclosures may indicate failure with an amber LED. Further, the status of S.M.A.R.T. failures may be communicated to the enclosure in a variety of ways. Similar to inconsistencies in LED indications, there is a possibility that no action is taken in response to such an S.M.A.R.T. failure. Thus, according to the techniques described herein, an intuitive 3D graphical representation 800 of a disk as shown in FIG. 8 can be provided. The graphical representation 800 can clearly indicate the different status indications for the disk, which can attract the immediate attention of an administrator. The graphical representation 800 can include disk product information 802 (e.g., disk vendor, model number, capacity, location in data room, S.M.A.R.T. capability, online/offline status, etc.), SCSI Check Configuration Data 804 and performance parameter information 806 (e.g., S.M.A.R.T. data). It should be understood that the graphical representation 800 is provided only as an example and that the graphical representation can include more or less information than the example and can take a variety of forms.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for predicting a risk of disk failure, comprising:
   identifying a group of disks for collective analysis;
   collecting at least one performance parameter for respective disks in the group of disks;
   calculating an expected value of the at least one performance parameter for the group of disks;
   comparing a respective value of the at least one performance parameter for at least one of the respective disks in the group of disks to the expected value;
   predicting a risk of disk failure when a difference between the respective value of the at least one performance parameter for the at least one of the respective disks in the group of disks and the expected value exceeds a threshold; and
   in response to predicting the risk of disk failure, performing media error checks on respective disks in the group of disks that are operating normally.

2. The computer-implemented method of claim 1, further comprising, upon completing the media error checks, migrating data from the at least one of the respective disks to a spare disk.

3. The computer-implemented method of claim 1, further comprising providing a notification of the risk of disk failure.

4. The computer-implemented method of claim 1, further comprising storing the at least one performance parameter for the respective disks in the group of disks in a log, wherein the log provides a historical record of the at least one performance parameter.

5. The computer-implemented method of claim 4, wherein the log is stored remotely from the respective disks in the group of disks.

6. The computer-implemented method of claim 1, further comprising graphically displaying the respective value of the at least one performance parameter for the at least one of the respective disks in the group of disks.

7. The computer-implemented method of claim 1, further comprising graphically displaying the difference between the respective value of the at least one performance parameter for the at least one of the respective disks in the group of disks and the expected value.

8. The computer-implemented method of claim 1, wherein the at least one performance parameter comprises at least one of environmental, transport event, or disk error information.

9. The computer-implemented method of claim 1, wherein the at least one performance parameter comprises Self-Monitoring Analysis and Reporting Technology (S.M.A.R.T.) data.

10. The computer-implemented method of claim 1, wherein the group of disks comprises at least one of a plurality of disks in close physical proximity, a plurality of disks in a same enclosure, or a redundant array of inexpensive disks (RAID) group.

11. A non-transitory computer-readable storage medium having computer-executable instructions stored thereon for predicting a risk of disk failure that, when executed by a storage server computer, cause the storage server computer to:
   identify a group of disks for collective analysis;
   collect at least one performance parameter for respective disks in the group of disks;
   calculate an expected value of the at least one performance parameter for the group of disks;
   compare a respective value of the at least one performance parameter for at least one of the respective disks in the group of disks to the expected value;
   predict a risk of disk failure when a difference between the respective value of the at least one performance parameter for the at least one of the respective disks in the group of disks and the expected value exceeds a threshold; and
   in response to predicting the risk of disk failure, perform media error checks on respective disks in the group of disks that are operating normally.

12. The non-transitory computer-readable storage medium of claim 11, having further computer-executable instructions stored thereon that, when executed by the storage server computer, cause the storage server computer to:
   upon completing the media error checks, migrate data from the at least one of the respective disks to a spare disk.

13. The non-transitory computer-readable storage medium of claim 11, having further computer-executable instructions stored thereon that, when executed by the storage server computer, cause the storage server computer to store the at least one performance parameter for the respective disks in the group of disks in a log, wherein the log provides a historical record of the at least one performance parameter.

14. The non-transitory computer-readable storage medium of claim 11, having further computer-executable instructions stored thereon that, when executed by the storage server computer, cause the storage server computer to graphically display at least one of:
   the respective value of the at least one performance parameter for the at least one of the respective disks in the group of disks, or
   the difference between the respective value of the at least one performance parameter for the at least one of the respective disks in the group of disks and the expected value.

15. The non-transitory computer-readable storage medium of claim 11, wherein the at least one performance parameter comprises at least one of environmental information, transport event information, disk error information, or Self-Monitoring Analysis and Reporting Technology (S.M.A.R.T.) data.

16. The non-transitory computer-readable storage medium of claim 11, wherein the group of disks comprises at least one of a plurality of disks in close physical proximity, a plurality of disks in a same enclosure, or a redundant array of inexpensive disks (RAID).

17. A storage server computer for predicting a risk of disk failure, comprising:
   a processing unit; and
   a memory operably coupled to the processing unit, the memory having computer-executable instructions stored thereon that, when executed by the processing unit, cause the storage server computer to:
   identify a group of disks for collective analysis;
   collect at least one performance parameter for respective disks in the group of disks;
   calculate an expected value of the at least one performance parameter for the group of disks;
   compare a respective value of the at least one performance parameter for at least one of the respective disks in the group of disks to the expected value;
   predict a risk of disk failure when a difference between the respective value of the at least one performance parameter for the at least one of the respective disks in the group of disks and the expected value exceeds a threshold; and in response to predicting the risk of disk failure, perform media error checks on respective disks in the group of disks that are operating normally.

18. The storage server computer of claim 17, wherein the memory has further computer-executable instructions stored thereon that, when executed by the processing unit, cause the storage server computer to:

upon completing the media error checks, migrate data from the at least one of the respective disks to a spare disk.

19. The storage server computer of claim 17, wherein the memory has further computer-executable instructions stored thereon that, when executed by the processing unit, cause the storage server computer to store the at least one performance parameter for the respective disks in the group of disks in a log, wherein the log provides a historical record of the at least one performance parameter.

* * * * *